US009739657B2

United States Patent
Cho et al.

(10) Patent No.: US 9,739,657 B2
(45) Date of Patent: Aug. 22, 2017

(54) OPTICAL SENSOR AND ELECTRONIC DEVICE WITH THE SAME

(71) Applicant: SAMSUNG ELECTRONICS CO., LTD., Suwon-si (KR)

(72) Inventors: Seong-Je Cho, Suwon-si (KR); Kwang-Bok Kim, Incheon (KR); Jae-Geol Cho, Yongin-si (KR); Jae-Hong Kim, Incheon (KR); Sun-Tae Jung, Yongin-si (KR); Chul-Ho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 14/590,091

(22) Filed: Jan. 6, 2015

(65) Prior Publication Data
US 2015/0198479 A1    Jul. 16, 2015

(30) Foreign Application Priority Data

Jan. 15, 2014  (KR) .................. 10-2014-0004879
Nov. 10, 2014  (KR) .................. 10-2014-0155422

(51) Int. Cl.
*G01J 1/04*  (2006.01)
*G01J 1/42*  (2006.01)
(Continued)

(52) U.S. Cl.
CPC .......... *G01J 1/0488* (2013.01); *G01J 1/0209* (2013.01); *G01J 1/0414* (2013.01); *G01J 1/0418* (2013.01);
(Continued)

(58) Field of Classification Search
None
See application file for complete search history.

(56) References Cited

U.S. PATENT DOCUMENTS 5,387,798 A    2/1995  Funakoshi et al.
5,432,873 A *  7/1995  Hosoya ................ G02F 1/3132
                                                     385/21
(Continued)

FOREIGN PATENT DOCUMENTS

DE    10159880 A1    9/2002
EP    0 911 658 A1   4/1999
(Continued)

OTHER PUBLICATIONS

Balliet L, et al., "Module-to-module communication via fiber-optic piping", IBM Technical Disclosure Bulletin, International Business Machines Corp. (Thornwood), US, vol. 22, No. 8B, Jan. 1, 1980 (Jan. 1, 1980), XP 002092656, ISSN: 0018-8689.
(Continued)

*Primary Examiner* — Tina Wong
(74) *Attorney, Agent, or Firm* — Sughrue Mion, PLLC

(57) ABSTRACT

An optical sensor and an electronic device having an optical sensor. The optical sensor includes: an optical waveguide containing a photochromic material; a light emitter that emits visible light to be incident on the optical waveguide; and a light receiver that detects the visible light emitted from the light emitter and progressing through the optical waveguide. A transmittance of the optical waveguide in relation to the visible light may be changed by the photochromic material as the optical waveguide is exposed to UV light. The optical sensor and the electronic device having the same may be variously implemented according to exemplary embodiments.

25 Claims, 12 Drawing Sheets

(51) Int. Cl.
   *G01J 1/50* (2006.01)
   *G01J 1/02* (2006.01)
   *G01J 1/06* (2006.01)
   *G01J 1/48* (2006.01)
(52) U.S. Cl.
   CPC ............... *G01J 1/0425* (2013.01); *G01J 1/06* (2013.01); *G01J 1/429* (2013.01); *G01J 1/48* (2013.01); *G01J 1/50* (2013.01)

(56) References Cited

U.S. PATENT DOCUMENTS

| | | | |
|---|---|---|---|
| 6,359,150 B1* | 3/2002 | Fukudome | C09K 9/02 548/517 |
| 6,438,295 B1* | 8/2002 | McGarry | G02F 1/0126 385/132 |
| 6,567,158 B1* | 5/2003 | Falciai | G01J 1/50 356/51 |
| 2004/0072100 A1* | 4/2004 | Mizokuro | G11B 7/245 430/270.14 |
| 2005/0094958 A1 | 5/2005 | Dorn et al. | |
| 2006/0251988 A1 | 11/2006 | Iftime et al. | |
| 2007/0108389 A1 | 5/2007 | Makela et al. | |
| 2011/0135248 A1 | 6/2011 | Langer et al. | |
| 2011/0171084 A1 | 7/2011 | Kossives | |
| 2014/0303043 A1* | 10/2014 | Kossives | G01N 21/78 506/39 |
| 2014/0327949 A1* | 11/2014 | Gross | E06B 9/24 359/244 |
| 2015/0029416 A1* | 1/2015 | Lee | G06F 3/0412 349/12 |
| 2015/0198479 A1* | 7/2015 | Cho | G01J 1/0488 250/474.1 |

FOREIGN PATENT DOCUMENTS

| | | |
|---|---|---|
| EP | 1157259 B1 | 11/2001 |
| JP | S60230104 A | 11/1985 |
| JP | 05072134 A * | 3/1993 |
| WO | 2009/036478 A2 | 3/2009 |

OTHER PUBLICATIONS

Communication from the European Patent Office issued Nov. 2, 2015 in a counterpart European Application No. 15150548.4.
Communication dated Jul. 20, 2015, issued by the European Patent Office in counterpart European Application No. 15150548.4.
Hewage Jinasena W: , "Towards the understanding of the photochemical ring opening and closing mechanisms for spiropyrans using 2H-pyran and the maximum overlap method" European Physical Journal D: Atoms, Molecules, Clusters and Optical Physics, EDP Sciences, Les Ulis, FR, vol. 67, No. 8, Aug. 19, 2013 (Aug. 19, 2013). pp. 1-5, XP035304936.
Sitiaishahhasbullah & Rumaisanordin et al: "The Versatility of Spiropyran as Multiresponsive Compound", Journal of Advanced Scientific Research, Jan. 1, 2014 (Jan. 1, 2014), pp. 1-6, XP055193290.
Search Report dated Mar. 16, 2015 issued in counterpart International Application No. PCT/KR2014/013092 (PCT/ISA/210).
Written Opinion dated Mar. 16, 2015 issued in counterpart International Application No. PCT/KR2014/013092 (PCT/ISA/237).
Henri Bouas-Laurent et al.; "Organic Photochromism"; Organic Chemistry Division Commission on Photochemistry; International Union of Pure and Applied Chemistry; vol. 73; No. 4; 2001; pp. 639-665.
Shencheng Fu et al.; "A new kinetic description of the complex optical behavior in photochromic polymer films"; Physica B 400; ScienceDirect; 2007; pp. 198-202.
Youngjune Hur et al.; "Spectroscopic interpretation on the UV-sensitivity of a spiroxazine-dispersed polymeric thin-film"; Thin Solid Films; vol. 419; 2002; pp. 207-212.

Natalia G. Shimkina et al.; "Photochromic silicone polymers based on 1,2-dihetarylethenes"; ARKIVOC; vol. (iv); 2008; pp. 112-119.
Xiaoliu Li et al.; "Synthesis of functionalized spiropyran and spirooxazine derivatives and their photochromic properties"; Journal of Photochemistry and Photobiology A: Chemistry 161; 2004; pp. 201-213.
Shih-Jieh Sun et al.; "New Polymers of Carbonic Acid. XXV. Photoreactive Cholesteric Polycarbonates Derived from 2,5-Bis(4'-hydroxybenzylidene)cyclopentanone and Isosorbide"; Journal of Polymer Science; vol. 37; 1999; pp. 1125-1133.
Murvet Volkan et al.; "A sol-gel derived AgCl photochromic coating on glass for SERS chemical sensor application"; Sensors and Actuators B 106; 2005; pp. 660-667.
Kyungho Kim et al.; "Active optical thin-film waveguide sensor for ion sensing"; Analytica Chimica Acta; vol. 343; 1997; pp. 199-208.
M. Mennig et al.; "Development of fast switching photochromic coatings on transparent plastics and glass"; Thin Solid Films; vol. 351; 1999; pp. 230-234.
"Global Solar UV Index: A Practical Guide"; World Health Organization et al; 2002; 18 pages total.
Tetsu Tatsuma et al.; "Multicolor Photochromism of TiO2 Films Loaded with Ag Nanoparticles: Mechanisms of Photo-bleaching by Visible Light"; Institute of Industrial Science; 1 page total.
Paulo J. Coelho et al; "Novel photochromic 2,2'-bithiopheme azo dyes"; Dyes and Pigments; ScienceDirect; vol. 82; 2009; pp. 130-133.
Huiyuan Hu et al.; "Optical switching and fluorescence modulation properties of photochromic dithienylethene derivatives"; Journal of Photochemistry and Photobiology A: Chemistry 189; ScienceDirect; 2007; pp. 307-313.
Kaihua Shen et al.; "Photochromic Behavior and Its Stability of a New Bifunctional Dye Composed of Spirobenzopyran and a Cinnamoyl Moiety"; Macromolecular Research; vol. 13; No. 3; 2005; pp. 180-186.
L. Hou et al.; "Photochromic properties of a silylated spirooxazine in sol-gel coatings"; Materials Letters; vol. 27; 1996; pp. 215-218.
Sang Yong Ju et al.; "Photochromism of a Styrene-Derived Polymer Having Pendant Phenoxyanthraquinones"; Journal of Photoscience; vol. 7; No. 4; 2000; pp. 131-133.
Despina Fragouli et al; "Photocontrolled Reversible Dimensional Changes of Microstructured Photochromic Polymers"; Advances in Unconventional Lithography; pp. 149-165.
Nobuhiro Kawatsuki et al.; "Photoinduced alignment control of photoreactive side-chain polymer liquid crystal by linearly polarized ultraviolet light"; Applied Physics Letters; vol. 74; No. 7; 1999; 4 pages total; doi: 10.10631/1.123414.
F. Ortica et al.; "Photokinetic behaviour of biphotochromic supramolecular systems Part 1. A bis-spirooxazine with a (Z)ethenic bridge between each moiety"; Journal of Photochemistry and Photobiology A: Chemistry; vol. 138; 2001; pp. 123-128.
Zheng-Sheng Fu; "Preparation and photochromism of carboxymethyl chitin derivatives containing spirooxazine moiety"; Dyes and Pigments; ScienceDirect; vol. 76; 2008; pp. 515-518.
Maria Rosaria di Nunzio et al.; "Role of the microenvironment on the fluorescent properties of a spirooxaine"; Chemical Physics Letters; ScienceDirect; vol. 491; 2010; pp. 80-85.
Ming-Qiang Zhu et al.; "Spiropyran-based Photochromic Polymer Nanoparticles with Optically Switchable Luminescence"; J Am Chem Soc.; NIH Public Access Author Manuscript; vol. 128; No. 13; Apr. 5, 2006; 19 pages total; doi: 10.1021/ja0567642.
Garry Berkovic et al.; "Spiropyans and Spirooxazines for Memories and Switches"; Chemical Reviews; vol. 100; No. 5; 2000; pp. 1741-1753.
U. Wiedemann et al.; "Switching photochromic molecules adsorbed on optical microfibres"; Optical Express; Optical Society of America; vol. 20; No. 12; Jun. 4, 2012; 11 pages total.
Hidetoshi Miyazaki et al.; "Synthesis of photochromic AgCl-urethane resin composite films"; 19 pages total.
Kazushi Hayashi et al.; "Temporal response of UV sensors made of highly oriented diamond films by 193 and 313 nm laser pulses"; Diamond and Related Materials; vol. 10; 2001; pp. 1794-1798.

(56) References Cited

OTHER PUBLICATIONS

Kyeongsik Ock et al.; "Thin film optical waveguide type UV sensor using a photochromic molecular device, spirooxazine"; Synthetic Metals; vol. 117; 2001; pp. 131-133.

Kenji Naoi et al.; "TiO2 Films Loaded with Silver Nanoparticles: Control of Multicolor Photochromic Behavior"; JACS Articles; J. Am. Chem. Soci.; vol. 126; No. 11; 2004; pp. 3664-3668.

E.D. Eugenieva et al.; "Waveguide properties of optical thin films grown by pulsed laser deposition"; Materials Science in Semiconductor Processing; vol. 3; 2000; pp. 575-579.

\* cited by examiner

Spiro-mero photochromism

Dithienylethene photochemistry

Azobenzene photoisomerization

OPTICAL SENSOR AND ELECTRONIC DEVICE WITH THE SAME

CROSS-REFERENCE TO RELATED APPLICATION

This application claims priority under 35 U.S.C. §119(a) from Korean Application Serial Nos. 10-2014-0004879 and 10-2014-0155422, which were filed in the Korean Intellectual Property Office on Jan. 15, 2014 and Nov. 10, 2014, respectively, the entire content of which is hereby incorporated by reference.

TECHNICAL FIELD

Apparatuses and methods consistent with exemplary embodiments relate generally to a sensor, for example, an optical sensor capable of detecting an amount of ultraviolet (UV) light.

BACKGROUND

UV light having a wavelength of 400 nm or less is divided into various bands based on the wavelength according to a rule of ISO 21348. 98% or more of the UV light reaching the surface of the earth by sunlight is UV light of UV-A region. The UV-A light has a wavelength of 315 nm to 400 nm. The UV-A light has effects on the human skin, and may cause, for example, a skin blackening phenomenon or skin aging. UV light from sunlight having a wavelength of 280 nm to 315 nm is defined as UV light of UV-B region (hereinafter, the UV light may also be referred to as "UV-B light"). About 2% of the UV light reaching the surface of the earth from the sunlight is the UV-B light. The UV-B light may have serious effects on the human body, causing, for example, skin cancer, a cataract, or a red spot phenomenon. Most of the UV-B light is absorbed in the ozone layer. However, the amount of UV-B light reaching the surface of the earth and the UV-B light arriving have increased due to the recent depletion of the ozone layer, thereby raising serious environmental concerns. The UV light of UV-C region (hereinafter, the UV light may also be referred to as "UV-C light) has a wavelength in the range of 100 nm-280 nm. Most of the UV-C light is absorbed in the atmosphere and hardly reaches the surface of the earth. However, the UV-C light reaches the surface of the earth in areas where the ozone layer has depleted, such as the southern hemisphere. The effects of UV light on the human body are variously quantified and a UV index is representative of the quantified ones and is defined as a value obtained by integrating the products of weighted values and UV intensities at respective wavelengths.

Due to the change of atmospheric environment and a cultural expansion of leisure sports, etc., exposure to UV light in everyday life has increased. The UV index keeps the public informed of the danger of exposure to UV light so as to prevent excessive exposure to UV light. When the excessive exposure to UV light is prevented, the public may maintain a healthy life, and an increase of social medical costs may be suppressed.

SUMMARY

In order to calculate a UV index, one or more exemplary embodiments provide a sensor capable of detecting the amount of UV light, for example, an optical sensor. As an optical sensor, a semiconductor type UV sensor based on an inorganic material, such as a silicon carbide (SiC), a gallium nitride (GaN), indium gallium nitride (InGaN), or an aluminum gallium nitride (AlGaN), may be used. The semiconductor type UV sensor may be configured to measure an amount of UV light having a wavelength in a predetermined region according to electric characteristics, such as a band gap, but it is difficult to measure UV light having a wavelength of another region. In addition, since a semiconductor type UV sensor exhibits a serious measurement deviation depending on an incident angle, it has a limit in calculating the correct UV index.

When a wide-angle lens is mounted on an optical sensor, the measurement deviation depending on the incident angle may be reduced. This is because the wide-angle lens mounted on the optical sensor refracts the incident angle so that the incident angle may be reduced. As the refractive index is increased by using the wide-angle lens, the relative sensitivity according to the incident angle may be maintained. However, since the reflectivity on the lens surface is increased, the absolute amount of light incident on the optical sensor may be reduced. In addition, due to the mounting of the wide-angle lens, the size of an electronic device equipped with the optical sensor, for example, an UV index measurement device, may be increased.

Accordingly, aspects of exemplary embodiments provide an optical sensor capable of reducing a measurement deviation of a light amount according to an incident angle, for example, a UV light measurement deviation, and an electronic device including the optical sensor.

In addition, aspects of exemplary embodiments provide an optical sensor that is easy to miniaturize and is capable of reducing a measurement deviation according to an incident angle, and an electronic device including the optical sensor.

According to an aspect of an exemplary embodiment, there is provided an optical sensor including: an optical waveguide containing a photochromic material; a light emitter configured to emit visible light to be incident on the optical waveguide; and a light receiver configured to detect the visible light emitted from the light emitter and progressing through the optical waveguide, wherein a transmittance of the optical waveguide in relation to the visible light may be changed photochromic material as the optical waveguide is exposed to ultraviolet (UV) light.

The photochromic material may include at least one of diarylethenes, spiropyrans, spirooxazines, chromenes, fulgides and fulgimides, diarylethenes and related compounds, spirodihydroindolizines, azo compounds, polycyclic aromatic compounds, anils and related compounds, polycyclic quinones (periaryloxyquinones), Perimidinespirocyclohexadienones, viologens, and triarylmethanes series derivative compounds.

The photochromic material may include at least one of 4-t-butyl-4'-methoxydibenzoylmethane, aberchrome TM540, N-ethoxycinnamate-3',3'-dimethylspiro(2H-5-nitro-1-benzopyran-2,2'-indoline), diarylethene, 1-phenoxyanthraquinone, 6-NO2BIPS, side-chainpolymerliquidcrystal (SPLC), bis-spiro[indoline-naphthoxazine](bis-SPO), spirooxazinemoietyanda2-methoxynaphthalenegroup(SPO-NPh), naphthoxazinespiroindoline(NOS), spiropyran, 2'-ethylhexyl-4-methoxy-cinnamate, heterocoerdianthroneendoperoxide(HECDPO), and an 1,2-dihetarylethenes.

The photochromic material may include at least one of $TiO_2$ and AgCl.

The light emitter may include a Laser Diode (LD), a Vertical Cavity Surface Emitting Laser (VCSEL), or a Light Emitting Diode (LED).

The light receiver may include a Photo Diode (PD).

The optical waveguide may include a light entrance surface provided on one end, and a light emission surface provided on the other end, and the light entrance surface and the light emission surface may be formed to be inclined in relation to a longitudinal direction of the optical waveguide.

The optical sensor may include a substrate having an optical waveguide recess formed on one side thereof, wherein the optical waveguide is formed in the optical waveguide recess.

The light emitter and the light receiver may be disposed on the one side of the substrate, and optical axes of the light emitter and the light receiver may be aligned in the inclined directions in relation to the light entrance surface and the light emission surface, respectively.

The optical sensor may include a substrate, on which each of the light emitter and the light receiver may be mounted, wherein the optical waveguide may be formed to protrude on one side of the substrate, and each of the light emitter and the light receiver may be disposed within the optical waveguide.

The optical sensor may include a light shielding film formed on a surface of the optical waveguide configured to block visible light incident on the light receiver from outside.

The visible light emitted from the light emitter may be reflected by the light shielding film while progressing through the optical waveguide, to be incident on the light receiver.

At least a part of the light shielding film may be removed to expose the optical waveguide to the outside.

The optical sensor may include a cover member disposed to enclose at least a periphery of the optical waveguide, wherein the cover member blocks visible light incident on the light receiver from the outside.

A plurality of light emitters and a plurality of light receivers are provided and at least one of the light emitters and at least one of the light receivers are disposed within an inside of the cover member to correspond with each other.

The optical sensor may include an opening formed on a top of the cover member; and a filter mounted on the opening, wherein the filter transmits UV light having a wavelength which causes a change of color of the photochromic material contained in the optical waveguide and blocks light having other wavelength.

Accordingly, the amount of visible light emitted from the light emitter and detected by the light receiving element may be varied depending on the exposure amount to the UV light. Through this, a UV index may be calculated.

According to an aspect of another exemplary embodiment, an electronic device includes: a cover member configured to transmit light; a light interruption layer formed on the cover member; an opening formed in the light interruption layer; and at least one optical waveguide disposed within the cover member configured to correspond with the opening. The optical waveguide contains a photochromic material so that a transmittance of the optical waveguide in relation to visible light is configured to change when the optical waveguide is exposed to UV light through the opening.

The electronic device may include a light emitter configured to emit visible light to be incident on the optical waveguide; and a light receiver configured to detect the visible light emitted from the light emitter and progressing through the optical waveguide.

The electronic device may include a substrate disposed to face the light interruption layer, wherein the optical waveguide, the light emitter, and the light receiver are disposed on one side of the substrate.

The electronic device may include an optical waveguide recess formed on the one side of the substrate, wherein the optical waveguide is formed in the optical waveguide recess.

The electronic device may include a light entrance surface formed on one end of the optical waveguide; and a light emission surface formed on the other end of the optical waveguide, wherein each of the light entrance surface and the light emission surface is formed to be inclined in relation to a longitudinal direction of the optical waveguide.

The visible light emitted from the light emitter may be reflected or refracted by the light entrance surface to be incident on the optical waveguide, and the visible light progressing through the optical waveguide may be reflected or refracted by the light emission surface to be incident on the light receiver.

According to an aspect of another exemplary embodiment, an optical sensor includes an optical waveguide configured to change its transparency according to a wavelength of external light; a light emitter configured to emit visible light toward a surface of the optical waveguide; and a light receiver configured to detect an amount of the visible light that has passed through the optical wavelength.

The optical waveguide may be disposed in a recessed portion of a substrate.

The optical waveguide may contain a photochromic material.

The optical sensor according to one or more exemplary embodiments may easily calculate a UV index since an optical waveguide containing the photochromic material changes its transmittance depending on the exposure amount to the UV light. In addition, unlike a semiconductor type UV sensor, an optical sensor may reduce the measurement deviation of a light amount according to an incident angle and may be easily miniaturized. Accordingly, it is possible to mount an optical sensor in an electronic device, for example, a mobile communication terminal, a cellphone, a multimedia device, etc. Further, when an optical sensor includes a plurality of optical waveguides, UV indexes of different wavelength bands may be easily calculated according to a component and content of a photochromic material contained in each of the optical waveguides.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
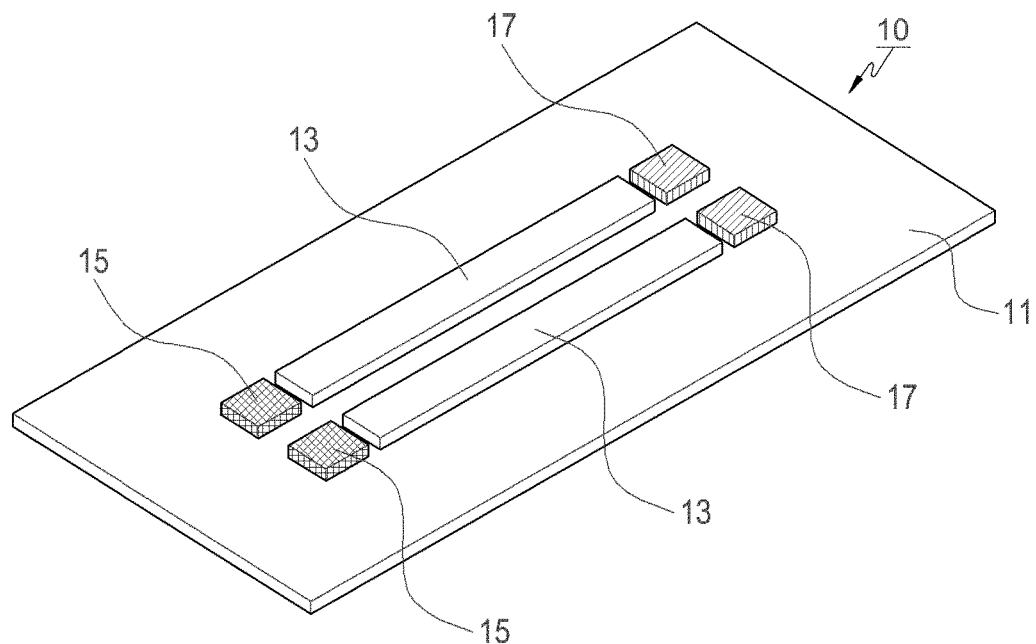
FIG. 1 is a view illustrating a configuration of an optical sensor according to an exemplary embodiment.

The exemplary embodiments will be described in detail with reference to the accompanying drawings, but they may be achieved in various forms and are not limited to the following embodiments. However, it should be understood that the present disclosure is not limited to the specific embodiments, but the present disclosure includes all modifications, equivalents, and alternatives within the spirit and the scope of the present disclosure.

Although the terms including an ordinal number such as "first", "second", etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order is determined in the mentioned order, or arbitrarily, and may not be arbitrarily changed if necessary.

In the present disclosure, the terms are used to describe an exemplary embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not exclude the existences or probability of addition of one or more another features, numeral, steps, operations, structural elements, parts, or combinations thereof.

In describing exemplary embodiments, terms such as "approximately," "nearly," "generally," and "substantially," may be used to indicate that a quoted characteristic, parameter, or value does not necessarily have to be exactly correct, and that a permissible error, a measurement error, or a deviation or change including a limit in measurement accuracy and other elements known to a person skilled in the art may be generated to an extent that an effect provided by any features is not excluded.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

Expressions such as "at least one of," when preceding a list of elements, modify the entire list of elements and do not modify the individual elements of the list.

In the one or more exemplary embodiments, an electronic device may be a random device, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display unit.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

FIG. 1 is a view illustrating a configuration of an optical sensor according to an exemplary embodiment.

As illustrated in FIG. 1, an optical sensor 10 according to an exemplary embodiment may include an optical waveguide 13, a light emitting element 15, and a light receiving element 17, which are disposed on a substrate 11.

The optical waveguide 13 may be formed of an optical fiber in a shape extending in one direction, and may include a photochromic material. The "photochromic material" may be a material which, upon being exposed to light having a specific wavelength, changes its absorbance depending on the wavelength. For example, the photochromic material may have the following properties. The photochromic material may be normally in a transparent state since its absorbance in relation to light in a visible light region is low and upon being exposed to UV light, becomes opaque since its absorbance in relation to light in the visible light region is increased. The photochromic material may contain, for example, compounds, such as 4-tert-butyl-4'-methoxydibenzoylmethane, aberchrome TM540, N-ethoxycinnamate-3', 3'-dimethylspiro(2H-5-nitro-1-benzopyran-2,2'-indoline), diarylethene, 1-phenoxyanthraquinone, 6-NO2BIPS, side-chain polymer liquid crystal (SPLC), bis-spiro[indoline-naphthoxazine](bis-SPO), spirooxazinemoietyanda2-methoxynaphthalenegroup(SPO-NPh), naphthoxazinespiroindoline (NOS), spiropyran, 2'-ethylhexyl-4-methoxy-cinnamate, heterocoerdianthroneendoperoxide (HECDPO), or 1,2-dihetarylethenes, and derivative compounds, silver (Ag), chlorine (Cl), fluorine (F), bromine (Br), iodine (I), and titanium (Ti). As the derivative compounds, diarylethenes, spiropyrans, spirooxazines, chromenes, fulgides and fulgimides, diarylethenes and related compounds, spirodihydroindolizines, azo compounds, polycyclic aromatic compounds, anils and related compounds, polycyclic quinones (periaryloxyquinones), Perimidinespirocyclohexadienones, viologens, and triarylmethanes series derivative compounds may be used. For example, the photochromic material, which may include at least one of a combination of the compounds and derivatives listed above, $TiO_2$, and AgCl, may be included in the optical waveguide. Among products common in everyday life, sunglasses or contact lenses, of which the color is changed depending on a light amount, may contain the photochromic material.

Due to the photochromic material contained therein, the optical waveguide 13 may change its transmittance in relation to visible light when it is exposed to UV light. Depending on a component and content of the photochromic material, the wavelength band of UV light, which causes the color of the photochromic material to be changed when the UV light is illuminated to the optical waveguide 13, may be varied. In addition, depending on the exposure amount of the optical waveguide 13 to UV light, the transmittance of the optical waveguide 13 in relation to visible light may be varied.

The light emitting element 15 is an element that emits visible light to be incident on the optical waveguide 13, and may be disposed adjacent to one end of the optical waveguide 13. The light emitting element 15 may include a Laser Diode (LD), a Vertical Cavity Surface Emitting Laser (VCSEL), and a Light Emitting Diode (LED). In FIG. 1, since the light emitting element 15 is disposed at nearly the same height as the optical waveguide 13 on the substrate 11, the light emitting element may be formed by a side surface light emitting diode. The visible light incident on the optical waveguide 13 by the light emitting element 15 progresses through the optical waveguide 13.

The light receiving element 17 is configured to detect the visible light emitted from the light emitting element 15 and progressing through the optical waveguide 13, and may be disposed adjacent to the other end of the optical waveguide 13. The light receiving element 17 may include a Photo Diode (PD).

The output of the visible light by the light emitting element 15 may be maintained to be nearly constant. However, the amount of visible light detected by the light receiving element 17 may be varied depending on the transmittance of the optical waveguide 13 in relation to the visible light. For example, when the optical waveguide 13 is exposed to UV light, the transmittance of the optical waveguide 13 in relation to visible light is lowered, and the amount of visible light detected by the light receiving element 17 may be reduced. When it is desired to calculate the UV index, the UV index may be calculated based on the amount of visible light detected by the light receiving element 17. For example, in an environment where the UV index is low, the transmittance of the optical waveguide 13 in relation to the visible light is increased so that the light receiving element 17 may detect most of the visible light emitted from the light emitting element 15, for example, 90% or more of the visible light. Whereas, in an environment where the UV index is high, the transmittance of the optical waveguide 13 in relation to the visible light is lowered so that the amount of visible light detected by the light receiving element 17 may be reduced. Accordingly, the UV index may be calculated based on the amount of visible light detected by the light receiving element 17.

The optical sensor 10 may include a plurality of optical waveguides 13, a plurality of light emitting elements 15, and a plurality of light receiving elements 17. The optical waveguides 13 may be different from each other in the components and contents of the photochromic materials contained therein. When the components and contents of the photochromic materials contained in the optical waveguides 13 are different from each other, the transmittances of the optical waveguides 13 in relation to visible light may be varied by different wavelengths of UV light, respectively. Accordingly, depending on the number of the optical waveguides 13, the optical sensor 10 may calculate respective UV indexes in a plurality of different wavelength regions.

Figure 2:
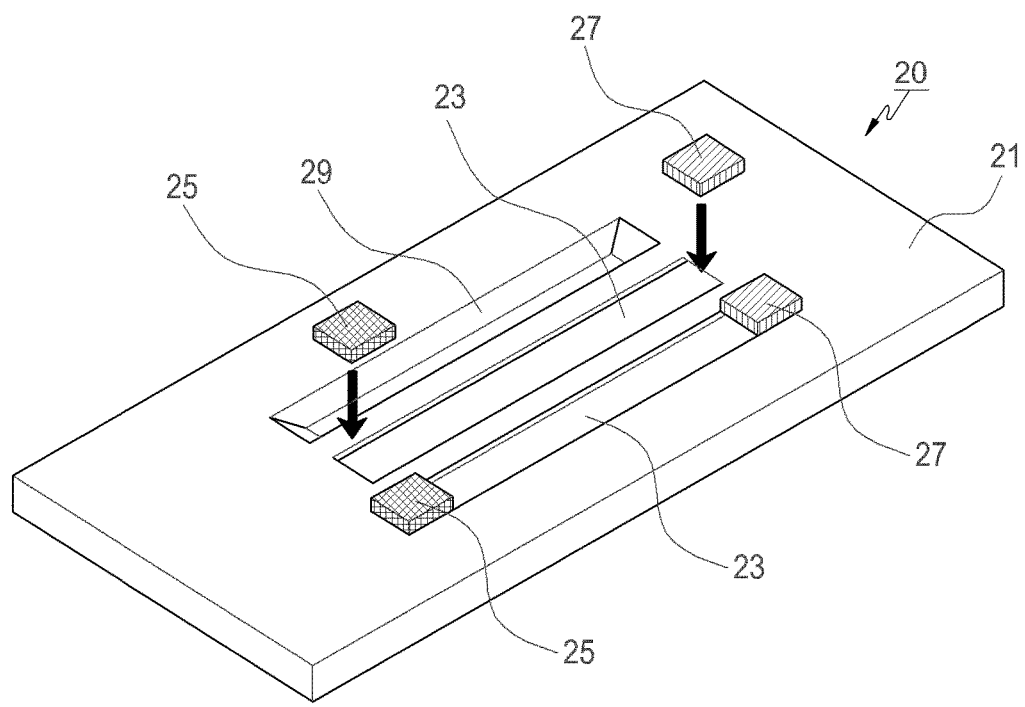
FIG. 2 is a view illustrating a configuration of an optical sensor according to an exemplary embodiment.
Figure 3:
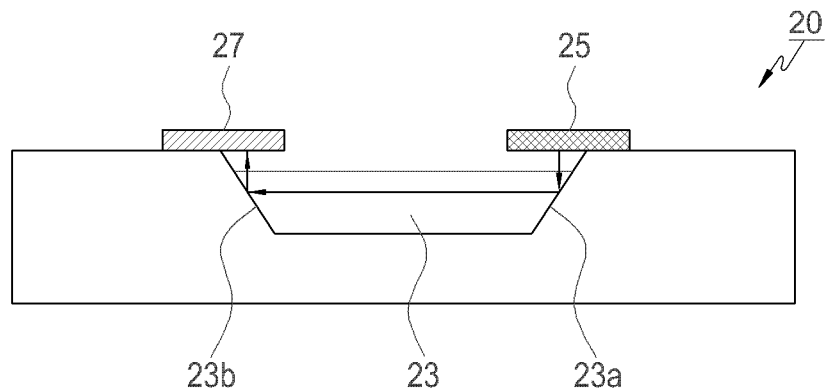
FIGS. 3 and 4 are views for illustrating an operation of the optical sensor according to an exemplary embodiment.
Figure 4:
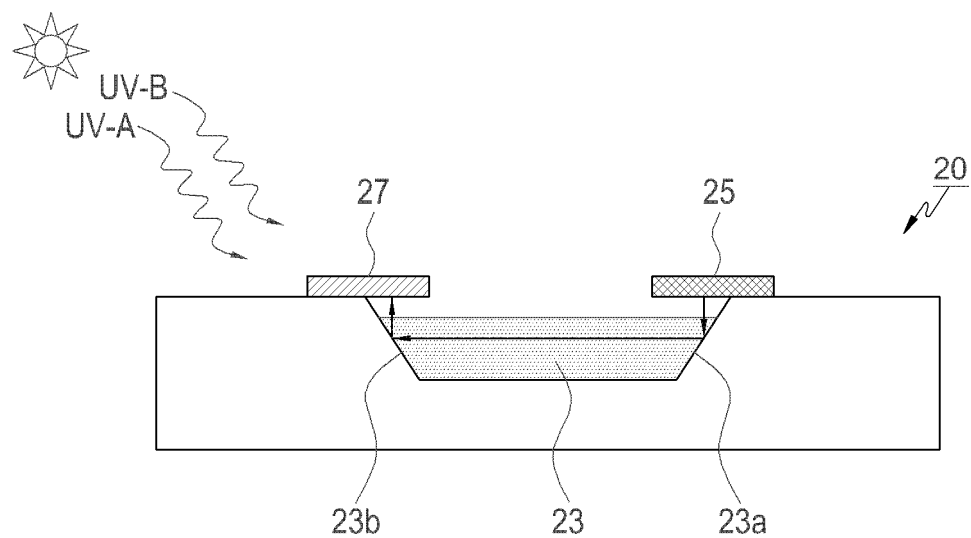

FIG. 2 is a view illustrating a configuration of an optical sensor according to another exemplary embodiment. FIGS. 3 and 4 are views illustrating operations of the optical sensor according to another exemplary embodiment.

In describing an exemplary embodiment, it is noted that descriptions on the components, which may be easily understood through the preceding exemplary embodiment, may be omitted. For example, detailed descriptions on the components of the photochromic material and the kinds of the light emitting elements and the light receiving elements may be omitted.

As illustrated in FIGS. 2 to 4, the optical sensor 20 according to an exemplary embodiment may include an optical waveguide recess 29 formed on one side of the substrate 21, and an optical waveguide 23 may be formed in the optical waveguide recess 29. The optical sensor 20 may include a light emitting element 25 and a light receiving element 27 mounted on the one side of the substrate 21. A plurality of optical waveguide guides 29 may be provided on the substrate 21, and the optical waveguide 23 formed in each of the optical waveguide recesses 29 may contain a photochromic material, of which the component and content may be different from those contained in the optical waveguides formed in the other optical waveguide recesses.

Each optical waveguide 23 may be provided with a light entrance surface 23a and a light emission surface 23b on the opposite ends thereof, respectively. The light entrance surface 23a and the light emission surface 23b may be disposed to be inclined in relation to the longitudinal direction of the optical waveguide 23, for example, in relation to the horizontal direction in FIG. 3. Although being referred to as a "light entrance surface" and "light emission surface" in describing an exemplary embodiment, the visible light does not necessarily have to be incident on the optical waveguide 23 through the light entrance surface 23a or be emitted from the optical waveguide 23 through the light emission surface 23b. For example, the light entrance surface 23a and the light emission surface 23b may reflect the visible light as illustrated in FIG. 3, depending on the structure of the optical waveguide 23 and the arrangement of the light emitting element 25 and the light receiving element 27. In an exemplary embodiment, the visible light may be refracted by the light entrance surface 23a and the light emission surface 23b to be incident on the optical waveguide 23 or be emitted from the optical waveguide 23.

The light emitting element 25 and the light receiving element 27 may be disposed at the positions adjacent to the light entrance surface 23a and the light emission surface 23b, respectively, so that the optical axes thereof are inclined in relation to the light entrance surface 23a and the light emission surface 23b, respectively. FIG. 3 exemplifies a configuration in which the entrance or emission of visible light is executed on the top side of the optical waveguide 23 and the visible light is reflected by the light entrance surface 23a and the light emission surface 23b. For example, the light emitting element 25 may be implemented by a vertical cavity surface emitting laser diode.

The visible light emitted from the light emitting element 25 may be incident on one end of the optical waveguide 23 through the top side, be reflected by the light entrance surface 23a, and then progress through the optical waveguide 23. When the visible light reaches the other end of the optical waveguide 23, the light emission surface 23b may reflect the visible light to be emitted to the top side of the optical waveguide 23. The light receiving element 27 may detect the visible light emitted to the top side of the optical waveguide 23 from the other end of the optical waveguide 23.

Referring to FIG. 4, when the optical waveguide 23 is exposed to UV light, the transmittance of the optical waveguide 23 in relation to the visible light may be varied depending on the component of the photochromic material contained in the optical waveguide 23 and the wavelength of the UV light. As the transmittance of the optical waveguide 23 in relation to the visible light is changed, the amount of visible light detected by the light receiving element 27 may be changed. Accordingly, the UV index may be calculated based on the amount of visible light detected by the light receiving element 27.

Figure 5:
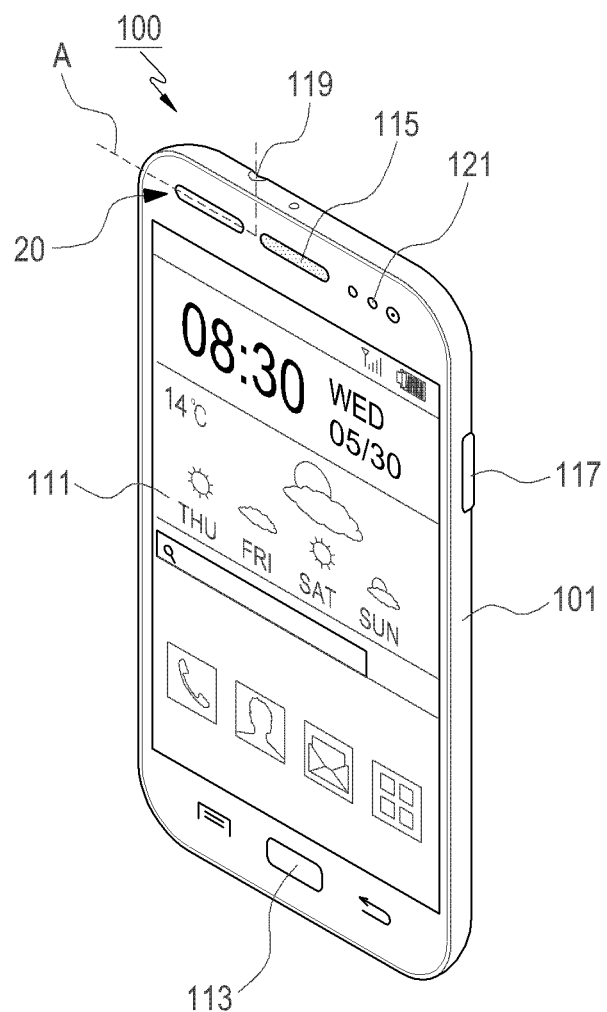
FIG. 5 is a perspective view illustrating an electronic device provided with an optical sensor according to an exemplary embodiment.

FIG. 5 is a perspective view illustrating an electronic device provided with an optical sensor according to an exemplary embodiment.

In describing an exemplary embodiment, descriptions will be made about the electronic device 100 using a mobile communication terminal as an example, but the present disclosure is not limited thereto.

For example, the electronic device may include at least one of the following: a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (e.g., a Head-Mounted-Device (HMD) such as electronic glasses, electronic clothes, an electronic bracelet, an electronic necklace, an electronic accessory, an electronic tattoo, and a smart watch.

According to an exemplary embodiment, the electronic device may be a smart home appliance provided with a communication function. For example, the smart home appliance may include at least one of the following: a television set, a Digital Video Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game consoles, an electronic dictionary, an electronic key, a camcorder, and an electronic picture frame.

According to an exemplary embodiment, the electronic device may include at least one of the following: various medical devices (e.g., a Magnetic Resonance Angiography (MRA), a Magnetic Resonance Imaging (MRI), a Computed Tomography (CT), a movie camera, and an ultrasonic machine), a navigation system, a Global Positioning System (GPS) receiver, an Event Data Recorder (EDR), a Flight Data Recorder (FDR)), an automotive infotainment device, electronic equipment for ships (e.g., marine navigation system and gyrocompass), an avionics, an electronic security device, and an industrial or home robot.

According to an exemplary embodiment, the electronic device may include at least one of the following: a piece of furniture or a part of building/structure including a communication function, an electronic board, an electronic signature receiving device, a projector, various measurement instruments (e.g., measurement instruments of water supply, electricity, gas, electromagnetic waves, etc.). The electronic device may be any one or a combination of two or more of the above-described various devices. In addition, it is apparent to a person skilled in the art that the electronic device according to the present disclosure is not limited to the above-described devices.

Referring to FIG. 5, the electronic device 100 may include a display device 111, a keypad 113, and a reception unit 115 which are provided on the front side of a housing 101. The display device 111 may be configured by a touch screen in which a touch panel is incorporated. The keypad 113 may be positioned below the display device 111, and may include an arrangement of a home button, a menu button, and a back button. On a lateral side of the housing 101, a power key 117, an ear jack socket 119, or the like may be disposed. The position of the power key 117, the ear jack socket 119, or the like may be variously changed according to the design of the electronic device.

The electronic device 100 may include various sensors. For example, the electronic device 100 may include a proximity sensor that detects whether a user's body approaches the electronic device 100, an illumination sensor 121 that automatically adjusts the brightness of the display device 111, a geomagnetic sensor/gyro sensor/GPS module which senses a position of the electronic device 100 and a change thereof, or the like.

The optical sensor 20 according to an exemplary embodiment may be installed adjacent to the receiving unit 115 together with the proximity sensor or the illumination sensor 121.

Hereinafter, the configuration having the optical sensor 20 installed in the electronic device 100 will be described in more detail with reference to FIG. 6.

Figures 6, 7:
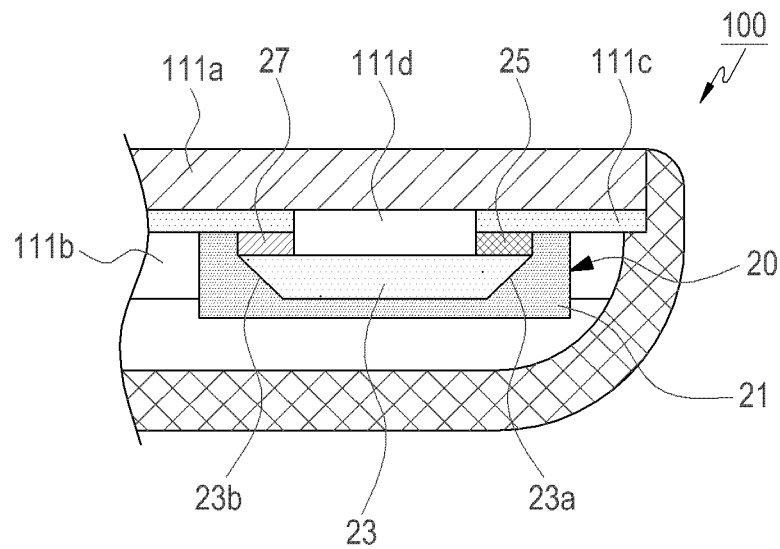
FIG. 6 is a cross-sectional view illustrating the electronic device provided with the optical sensor according to an exemplary embodiment in a state where the electronic device is partially cut away.
FIG. 7 is a view for illustrating a change of an optical waveguide in an optical sensor according to an exemplary embodiment.

FIG. 6 is a cross-sectional view illustrating the electronic device including the optical sensor according to an exemplary embodiment in a state where the electronic device is partially cut away.

The display device 111 of the electronic device 100 may include a cover member 111a, a display unit 111b, and a light interruption layer 111c.

The cover member 111a may protect the display unit 111b and transmit a figure output through the display unit 111b. Accordingly, the cover member 111a may be made of a transparent material, for example, a synthetic resin, such as transparent acryl. Alternatively, the cover member 111a may be made of a glass material. When a touch panel is incorporated in the cover member 111a, the display device 111 may be used as an input device. In assembling the cover member 111a to the housing 101, the light interruption layer 111c may be formed on the peripheral edge of the cover member 111a to conceal an assembly structure or the like. The light interruption layer 111c may be formed by coating a colored paint. An opening 111d may be formed in the light interruption layer 111c to expose the optical waveguide 23 of the optical sensor 20.

The substrate 21 of the optical sensor 20 may be disposed on the inner surface of the cover member 111a to face the light interruption layer 111d. The optical waveguide 23 is positioned to correspond to the opening 111d, and the light emitting elements 25 and the light receiving elements 27 may be positioned on the light interruption layer 111c in the outside of the opening 111d. The visible light emitted from the light emitting element 25 may be reflected or refracted by the light entrance surface 23a to progress through the optical waveguide 23.

The electronic device 100 may calculate an UV index through the optical sensor 20, and the calculated UV index may be output through the display device 111. An application installed in the electronic device 100 may allow the calculated UV index to be supplied to a service provider so that the service provider may put received UV indexes together and provide various life information items, or the like, including the received UV indexes. An application may allow various life information items to be output to a user through the electronic device 100 according to information items stored therein and a currently calculated UV index.

Figure 8:
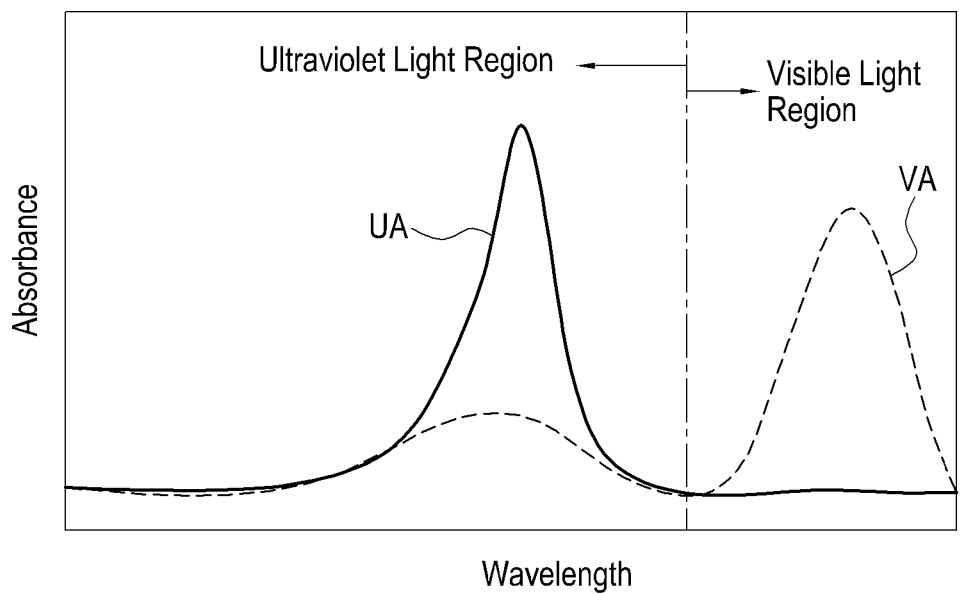
FIG. 8 is a view illustrating a change of a relative absorbance of an optical sensor according to an exemplary embodiment.

FIG. 7 is a view illustrating a change of an optical waveguide in an optical sensor according to an exemplary embodiment. FIG. 8 is a view illustrating a change of relative absorbance of an optical sensor according to an exemplary embodiment.

As illustrated in FIG. 7, upon being exposed to UV light in a transparent state, an optical waveguide containing a photochromic material is changed to an opaque state, and upon being exposed to visible light or heat, the optical waveguide is changed to the transparent state again. Referring to FIG. 8, the optical sensor containing the photochromic material as described above, for example, the optical waveguide, may have a high relative absorbance UA in relation to UV light and a low relative absorbance in relation to light in the visible light region in the transparent state. When the photochromic material is exposed to the UV light, the relative absorbance VA in relation to light having another wavelength, for example, light in the visible light region, may be increased. Accordingly, when the optical waveguide containing the photochromic material as described above is exposed to UV light, the transmittance in relation to light in the visible light region may be lowered.

Figure 9:
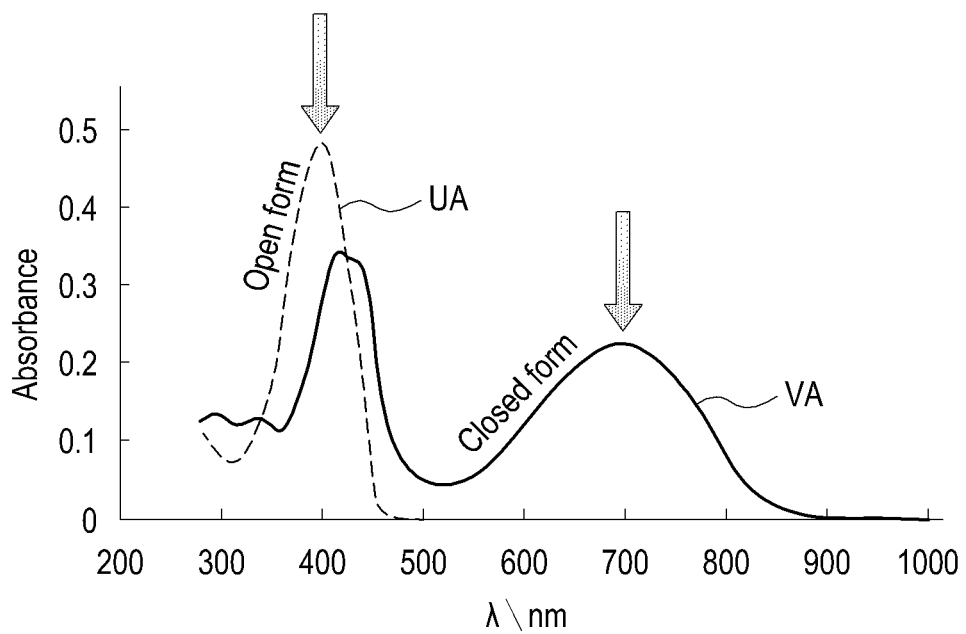
FIG. 9 is a view illustrating a change of a relative absorbance of an optical sensor according to an exemplary embodiment, in which a benzene series compound is used as the photochromic material of an optical sensor.
Figure 10:
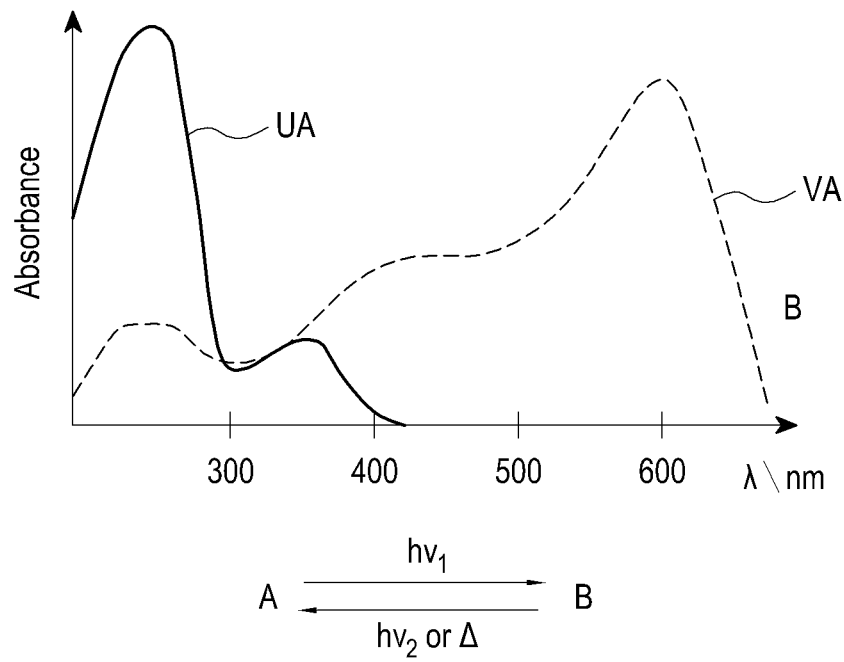
FIG. 10 is a view illustrating a variation of a relative absorbance of an optical sensor according to an exemplary embodiment, in which a spiropyrane series compound is used as the photochromic material of the optical sensor.
Figure 11:
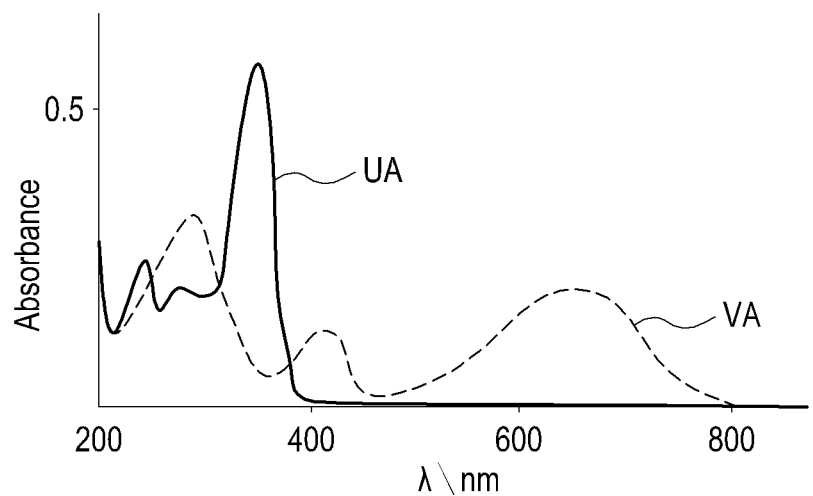
FIG. 11 is a view illustrating variation of a relative absorbance of an optical sensor according to an exemplary embodiment in which an acetonitrile (CH3CN) series compound is used as the photochromic material of the optical sensor.

More exemplary relative absorbances according to the compositions of photochromic materials are illustrated in FIGS. 9 to 11.

FIG. 9 is a view illustrating a change of a relative absorbance of an optical sensor according to an exemplary embodiment in which a benzene series compound is used as the photochromic material of the optical sensor.

A photochromic material made of a benzene series compound may exhibit an increased relative absorbance in relation to light having a wavelength of approximately 700 nm when it is exposed to UV light having a wavelength of approximately 400 nm. Accordingly, a UV light intensity in the UV-A range may be calculated using the benzene series compound as the photochromic material.

FIG. 10 is a view illustrating variation of a relative absorbance of an optical sensor according to an exemplary embodiment, in which a spiropyrane series compound is used as the photochromic material of the optical sensor.

A photochromic material made of a spiropyrane series compound may exhibit an increased relative absorbance in relation to light having a wavelength of approximately 630 nm when it is exposed to UV light having a wavelength of approximately 260 nm. Accordingly, a UV light intensity of the mid-ultraviolet (MU-V) region having a wavelength of 200 to 300 nm or the UV-B region may be calculated using the spiropyrane series compound as the photochromic material.

FIG. 11 is a view illustrating variation of a relative absorbance of an optical sensor according to an exemplary embodiment in which an acetonitrile ($CH_3CN$) series compound is used as the photochromic material of the optical sensor.

A photochromic material made of an acetonitrile series compound may exhibit an increased relative absorbance in relation to light having a wavelength of approximately 650 nm when it is exposed to UV light having a wavelength of approximately 370 nm. Accordingly, a UV light intensity of the UV-A region may be calculated using the acetonitrile series compound as the photochromic material.

FIGS. 12 to 17 are views illustrating exemplary photochromic materials contained in an optical waveguide of an optical sensor according to an exemplary embodiment.

Figure 12:
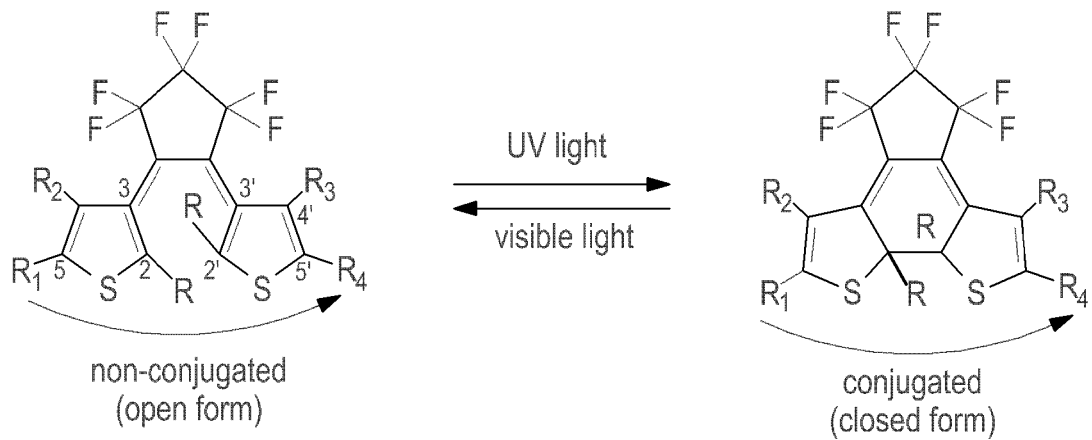
FIGS. 12 to 17 are views illustrating exemplary photochromic materials contained in an optical waveguide of an optical sensor according to an exemplary embodiment.
Figure 13:
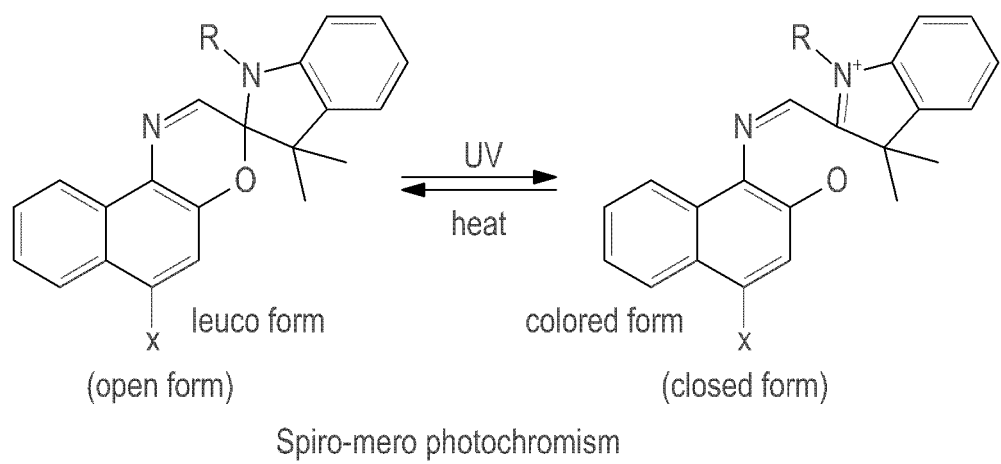
Figure 14:
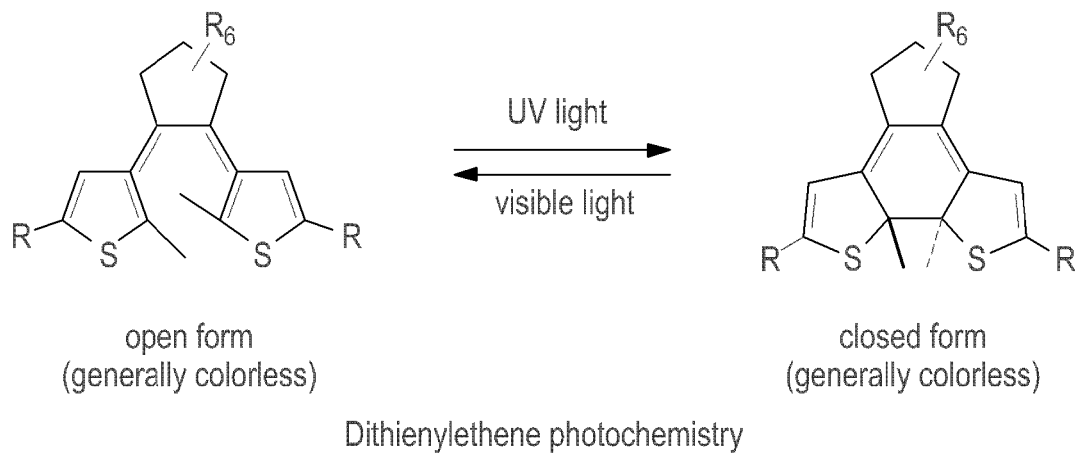
Figure 15:
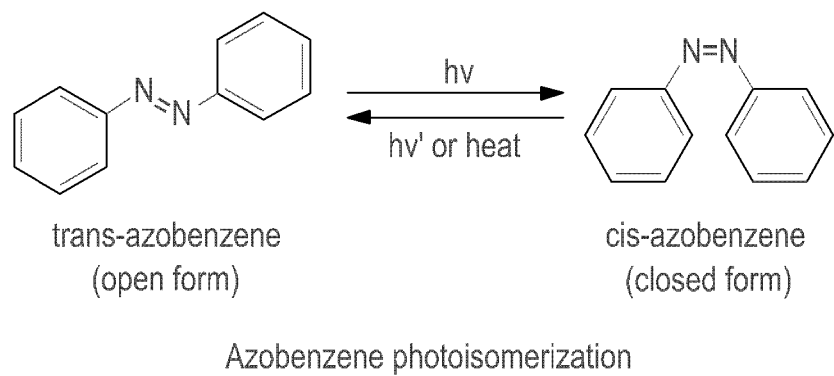
Figure 16:
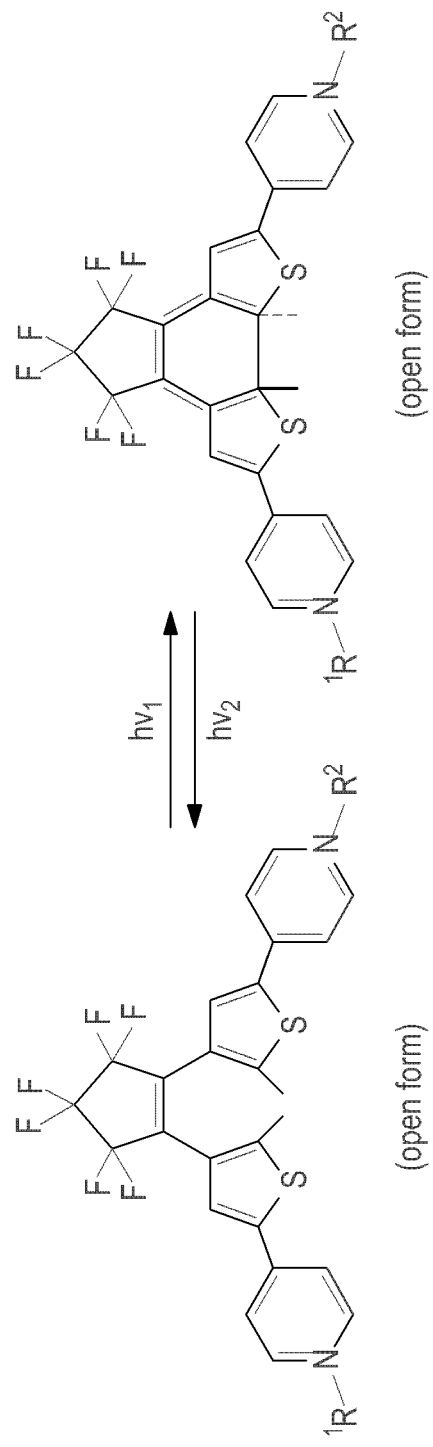
Figure 17:
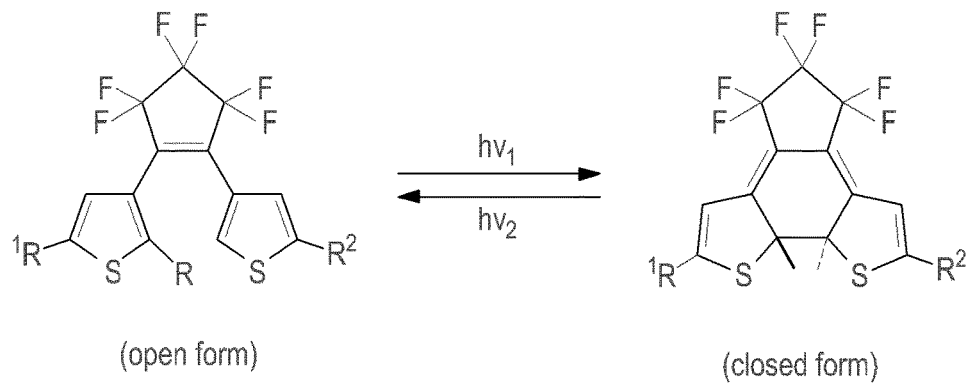

FIG. 12 illustrates a structure of a bis-thien-3-yl-perfluorocyclopentene compound, FIG. 13 illustrates a structure of a spiro-mero compound, FIG. 14 illustrates a structure of a dithienylethene compound, FIG. 15 illustrates a structure of an azobenzene compound, and FIGS. 16 and 17 illustrates other structures of the dithienylethene compound, respectively.

The relative absorbance in relation to UV light or visible light may be varied depending on a derivative compound bonded to a compound which forms the photochromic materials as described above.

A photochromic material obtained by bonding a $CH_3$ derivative compound to the dithienylethene compound illustrated in FIG. 16 may exhibit an increased relative absorbance in relation to light having a 662 nm when it is exposed to UV light having a wavelength of 352 nm in the transparent state.

Table 1 represents the kinds of derivative compounds, Rx bonded to the dithienylethene compound, illustrated in FIG. 17, and wavelengths measured when the photochromic materials containing the derivative compounds Rx exhibited a high relative absorbance.

TABLE 1

| Derivative | R1 | R2 | Wavelength |
|---|---|---|---|
| open closed | (benzo-dithiole structure) | $HC=C(CN)_2$ | 354 828 |
| open closed | | (C(=O)H acyl structure) | 296 624 |
| open closed | | $HC=C(CN)_2$ | 361 727 |

TABLE 1-continued

| Derivative | R1 | R2 | Wavelength |
|---|---|---|---|
| open closed | (benzodithiole structure) | (=CH2) | 350 713 |
| open closed | (benzodithiole structure) | (=CH-C(=O)-H) | 350 702 |

As represented in Table 1, the photochromic materials may exhibit high relative absorbances at different wavelengths depending on the kinds of derivative compounds, even if the compounds forming the photochromic materials are the same. Accordingly, when an optical sensor provided with a plurality of optical waveguides containing photochromic materials having different compositions is used, UV light intensities may be calculated for a plurality of different wavelength bands, respectively.

Figure 18:
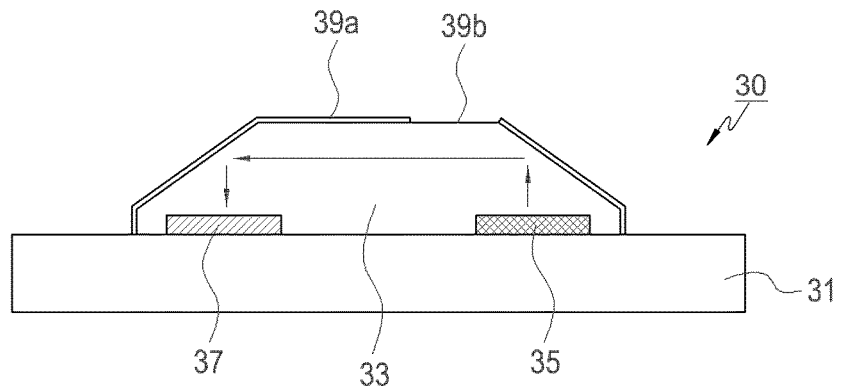
FIG. 18 is a view illustrating a configuration of an optical sensor according to an exemplary embodiment.
Figure 19:
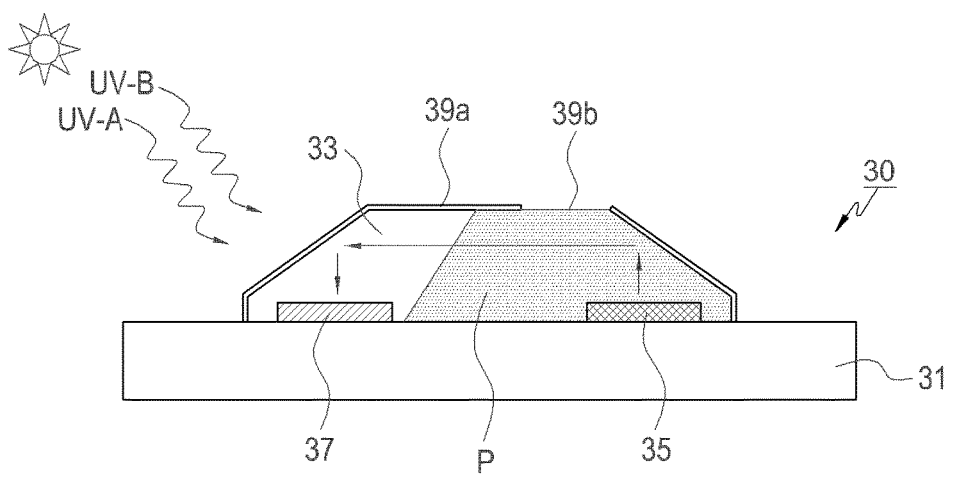
FIG. 19 is a view illustrating an operation of an optical sensor according to an exemplary embodiment.

FIG. 18 is a view illustrating a configuration of an optical sensor according to an exemplary embodiment. FIG. 19 is a view illustrating an operation of the optical sensor according to an exemplary embodiment.

Referring to FIGS. 18 and 19, the optical sensor 30 may include a light emitting element 35 and a receiving element 37, each of which is mounted on one side of a substrate 31, and an optical waveguide 33 may be formed to protrude from the one side of the substrate 31. Each of the light emitting element 35 and the light receiving element 37 may be disposed within the optical waveguide 33. The optical waveguide 33 may contain a photochromic material, for example, a material which exhibits a changed color upon being exposed to light. The photochromic material may exhibit a color which may be changed depending on its composition and a wavelength of light to which it is exposed. As described above, a photochromic material, which exhibits a color changed by UV light, may be contained in the optical waveguide 33. When the photochromic material is exposed to UV light, the optical waveguide 33 may exhibit a changed color so that the transmittance (or absorbance) of the optical waveguide 33 in relation to visible light may be varied. The light emitting element 35 emits visible light to the inside of the optical waveguide 33, and the light receiving element 37 may detect the visible light emitted from the light emitting element 35. When the transmittance of the optical waveguide 33 in relation to the visible light is changed, the amount of visible light detected by the light receiving element 37 is varied. Through this, the optical sensor 30 may calculate a UV index.

The optical sensor 30 may further include a light shielding film 39a formed on a surface of the optical waveguide 33. The light shielding film 39a may block other light incident on the light receiving element 37 from the outside, for example, visible light. In addition, the light shielding film 39a reflects the light emitted from the light emitting element 35 so that the light progresses through the inside of the optical waveguide 33. For example, the light shielding film 39a may allow the light emitted from the light emitting element 35 to progress through the inside of the optical waveguide 33 while blocking the external light incident on the optical waveguide 33. However, the optical sensor 30 may include an opening 39b formed by removing at least a part of the light shielding film 39a so that a part of the optical waveguide 33 may be exposed to the outside. Light (e.g., UV light) outside of the light shielding film 39a is illuminated to a part of the optical waveguide 33 through the opening 39b so that the photochromic material contained in the optical waveguide 33 may change its color. The position of the opening 39b may be properly set such that the external light incident on the optical waveguide 33 through the opening 39b does not reach the light receiving element 37.

The light incident on the optical waveguide 33 through the opening 39b causes the color of the photochromic material to be changed so that a portion P of the optical waveguide 33 may change the transmittance in relation to visible light. As the transmittance of the portion P of the optical waveguide 33 in relation to the visible light is changed, the amount of visible light emitted from the light emitting element 35 and detected by the light receiving element 37 is changed and the optical sensor 30 may calculate an UV index based on the change of the visible light detected by the light receiving element 37.

Figure 20:
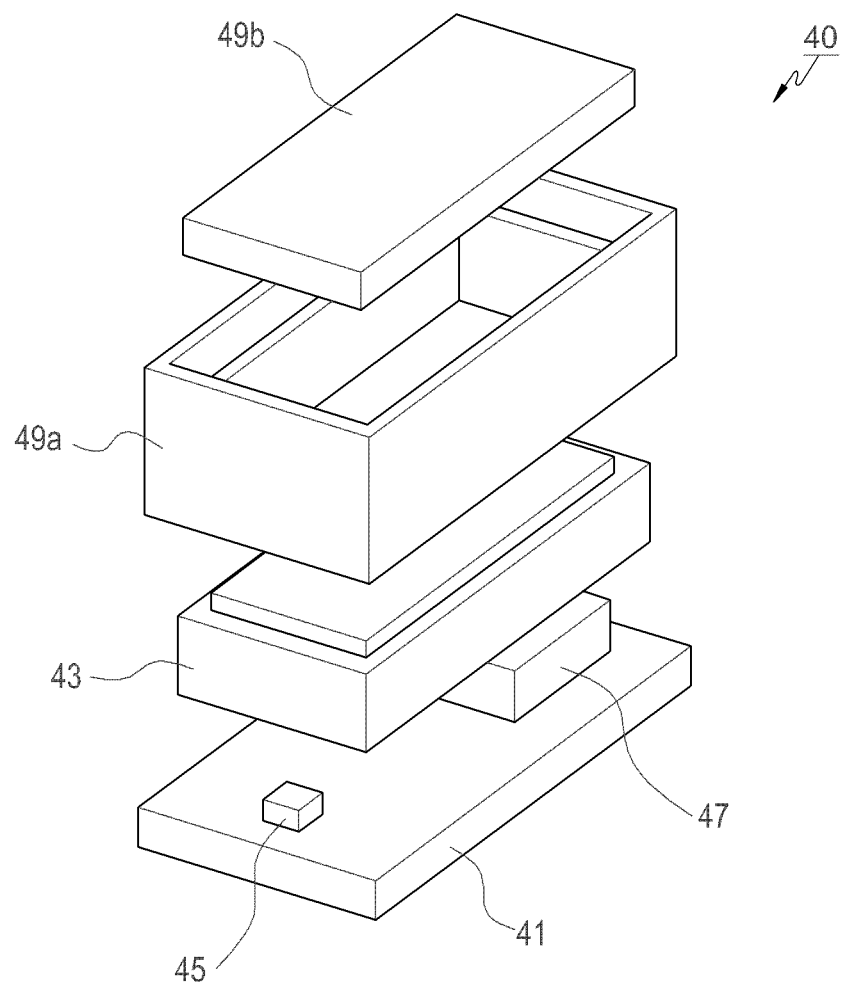
FIG. 20 is a view illustrating an implemented optical sensor according to an exemplary embodiment.
Figure 21:
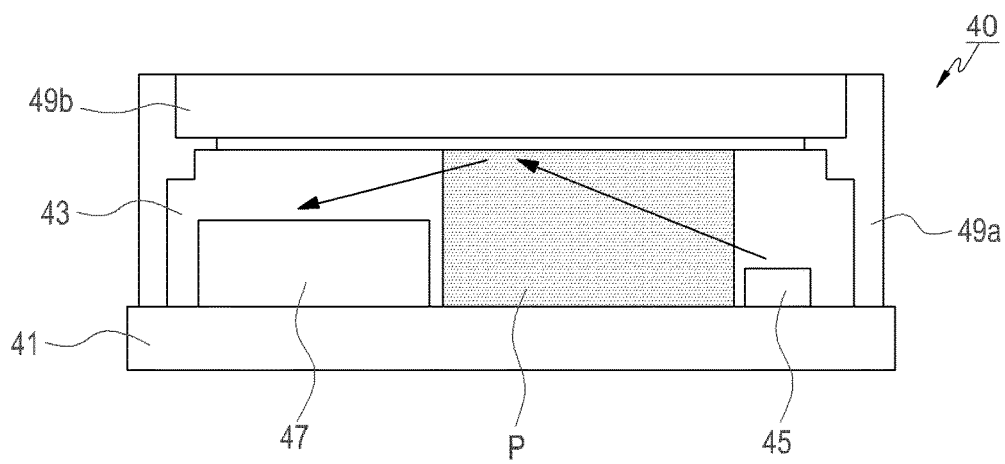
FIG. 21 is a cross-sectional view illustrating an implemented optical sensor according to an exemplary embodiment.

FIG. 20 is a view illustrating an implemented optical sensor according to an exemplary embodiment. FIG. 21 is a cross-sectional view illustrating an optical sensor according to an exemplary embodiment.

Referring to FIGS. 20 and 21, the optical sensor 40 may include an optical waveguide 43 formed to protrude on one side of a substrate 41, and a light emitting element 45 and a light receiving element 47 may be mounted to correspond with each other within the optical waveguide 43. The optical sensor 40 may include a cover member 49a that provides the function of the light shielding film. The cover member 49a may be mounted on the one side of the substrate 41 to enclose at least a part of the optical waveguide 43. For example, the cover member 49a may be mounted to enclose the periphery of the optical waveguide 43, and the top of the cover member 49a may be opened. A filter 49b may be mounted on the opened top of the cover member 49a. The filter 49b may reflect visible light while transmitting UV light. For example, the filter 49b may reflect external visible light not to be incident on the optical waveguide 43, and may transmit light (e.g., UV light) having a wavelength which causes the color of the photochromic material contained in the optical waveguide 43 to be changed. The visible light emitted from the light emitting element 45 and progressing through the inside of the optical waveguide 43 may also be reflected by the filter 49b to be incident on the light receiving element 47. In this manner, the light shielding film and the opening of the preceding exemplary embodiment may be implemented by the cover member 49a and the filter 49b of an exemplary embodiment.

The light (e.g., UV light) incident on the optical waveguide 43 through the filter 49b causes the color of the photochromic material to be changed so that the transmittance of at least the portion P of the optical waveguide 43 in relation to visible light may be changed. The optical sensor 40 may calculate a UV index based on the change of the transmittance of the optical waveguide 43 in relation to the visible light. The filter 49b may transmit the light (e.g., UV light) having a wavelength causing the color of the photochromic material contained in the optical waveguide 43 to be changed and the light having a different wavelength may be blocked by the cover member 49a and the filter 49b. Accordingly, the light receiving element 47 may detect the light (e.g., visible light) emitted from the light emitting element 45 without being affected by the external environment.

Figure 22:
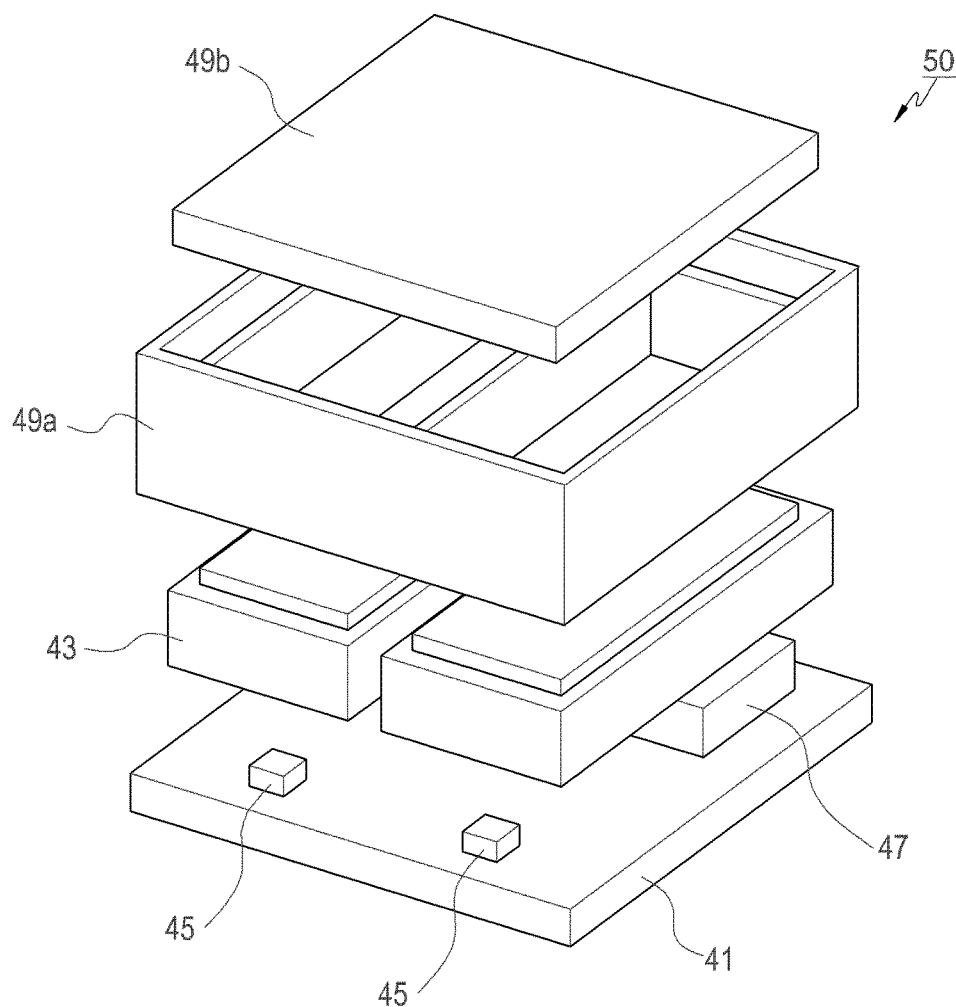
FIG. 22 is a view illustrating another implemented example of an optical sensor according to an exemplary embodiment.

FIG. 22 is a view illustrating an implemented optical sensor according to an exemplary embodiment.

The optical sensor 50 according to the present exemplary embodiment is similar to the optical sensor 40 of the preceding exemplary embodiment but different from the optical sensor 40 in that a plurality of optical waveguides are disposed on a single substrate. Accordingly, it is noted that in describing the present exemplary embodiment, the same reference numerals will be given to the components, which may be easily understood from the preceding exemplary embodiment, or omitted, and detailed descriptions may also be omitted.

Referring to FIG. 22, the optical sensor 50 may include one or more optical waveguides 43, for example, a pair of optical waveguides 43 that are disposed on one side of a substrate 41 to be parallel to each other. Each of the optical waveguides 43 may accommodate a light emitting element 45 and a light receiving element 47, which may be separated from each other by a cover member 49a. The cover member 49a may accommodate the optical waveguides 43 to be separated from each other. A filter 49b may be mounted on the top of the cover member 49a so as to transmit only the light (e.g., UV light) having a wavelength which causes the color of the photochromic material contained in each of the optical waveguides 43. For example, the filter 49b may only transmit UV light while blocking or reflecting visible light or infrared light. The visible light emitted from each of the light emitting elements 45 may be blocked or reflected by the cover member 49a and the filter 49b to progress through the inside of each of the optical waveguides 43, thereby being detected by one of the light receiving elements 47.

The compositions of the photochromic materials contained in the optical waveguides 43 may be different from each other. For example, one of the optical waveguides 43 may contain a photochromic material of which the color is changed by the UV light in the UV-A region and the other one may contain a photochromic material of which the color may be changed by the UV light in the UV-B region. For example, the optical sensor 50 according to the present exemplary embodiment may calculate a UV index of each of a plurality of wavelength regions.

While the present disclosure has been shown and described with reference to one or more exemplary embodiments, it will be understood by those skilled in the art that various changes in form and details may be made therein without departing from the spirit and scope of the present disclosure as defined by the appended claims.

For example, in the one or more exemplary embodiments, a configuration in which a light emitting element is mounted in an optical sensor itself has been exemplified. However, when the optical sensor is mounted in an electronic device that is provided with a luminance sensor, the light emitting element does not necessarily have to be mounted in the optical sensor. For example, both the luminance sensor and the light receiving element of the optical sensor may detect visible light from sunlight. However, the light receiving element may detect the visible light (visible light from the sunlight) that passes through the optical waveguide containing the photochromic material. Accordingly, the amount of visible light detected by the luminance sensor and the amount of visible light detected by the light receiving element may be compared with each other to calculate the transmittance of the optical waveguide, and a UV index may be calculated based on the transmittance of the optical waveguide.

In addition, although a configuration, in which the optical sensor is disposed on a light interruption layer laterally from a display device, has been exemplified in one or more exemplary embodiments, the optical sensor may be provided on a lateral side or a rear side of the electronic device.

What is claimed is:

1. An optical sensor comprising:
   an optical waveguide containing a photochromic material;
   a light emitter configured to emit visible light to be incident on the optical waveguide; and
   a light receiver configured to detect the visible light emitted from the light emitter and progressing through the optical waveguide,
   wherein a transmittance of the optical waveguide in relation to the visible light is changed by the photochromic material as the optical waveguide is exposed to ultraviolet (UV) light.

2. The optical sensor of claim 1, wherein the photochromic material comprises at least one of diarylethenes, spiropyrans, spirooxazines, chromenes, fulgides and fulgimides, diarylethenes and related compounds, spirodihydroindolizines, azo compounds, polycyclic aromatic compounds, anils and related compounds, polycyclic quinones (periaryloxyquinones), Perimidinespirocyclohexadienones, viologens, and triarylmethanes series derivative compounds.

3. The optical sensor of claim 1, wherein the photochromic material comprises at least one of 4-t-butyl-4'-methoxydibenzoylmethane, aberchrome TM540, N-ethoxycinnamate-3',3'-di methyl spiro(2H-5-nitro-1-benzopyran-2, 2'-indoline), di aryl ethen e, 1-phenoxyanthraquinone, 6-NO2BIPS, side-chainpolymerliquidcrystal(SPLC), bisspiro[indoline-naphthoxazine](bis-SPO), spirooxazinemoietyanda2-methoxynaphthalenegroup(SPO-NPh), naphthoxazinespiroindoline(NOS), spiropyran, 2'-ethylhexyl-4-methoxy-cinnamate, heterocoerdianthroneendoperoxide (HECDPO), and an 1,2-dihetarylethenes.

4. The optical sensor of claim 1, wherein the photochromic material comprises at least one of $TiO_2$ and AgCl.

5. The optical sensor of claim 1, wherein the light emitter comprises a Laser Diode (LD), a Vertical Cavity Surface Emitting Laser (VCSEL), or a Light Emitting Diode (LED).

6. The optical sensor of claim 1, wherein the light receiver comprises a Photo Diode (PD).

7. The optical sensor of claim 1, wherein the optical waveguide comprises a light entrance surface provided on one end, and a light emission surface provided on an other end, and
   the light entrance surface and the light emission surface are formed to be inclined in relation to a longitudinal direction of the optical waveguide.

8. The optical sensor of claim 7, further comprising:
   a substrate having an optical waveguide recess formed on one side thereof,
   wherein the optical waveguide is formed in the optical waveguide recess.

9. The optical sensor of claim 8, wherein the light emitter and the light receiver are disposed on the one side of the substrate, and optical axes of the light emitter and the light receiver are aligned in the inclined directions in relation to the light entrance surface and the light emission surface, respectively.

10. The optical sensor of claim 1, further comprising:
    a substrate, on which each of the light emitter and the light receiver is mounted,
    wherein the optical waveguide is formed to protrude on one side of the substrate, and each of the light emitter and the light receiver is disposed within the optical waveguide.

11. The optical sensor of claim 10, further comprising:
a light shielding film formed on a surface of the optical waveguide configured to block visible light incident on the light receiver from outside.

12. The optical sensor of claim 11, wherein the visible light emitted from the light emitter is reflected by the light shielding film while progressing through the optical waveguide, to be incident on the light receiver.

13. The optical sensor of claim 11, wherein at least a part of the light shielding film is removed to expose the optical waveguide to the outside.

14. The optical sensor of claim 10, further comprising:
a cover member disposed to enclose at least a periphery of the optical waveguide,
wherein the cover member blocks visible light incident on the light receiver from the outside.

15. The optical sensor of claim 14, wherein a plurality of light emitters and a plurality of light receivers are provided and at least one of the light emitters and at least one of the light receivers are disposed within an inside of the cover member to correspond with each other.

16. The optical sensor of claim 14, further comprising:
an opening formed on a top of the cover member; and
a filter mounted on the opening,
wherein the filter transmits UV light having a wavelength which causes a change of color of the photochromic material contained in the optical waveguide and blocks light having other wavelength.

17. An electronic device comprising:
a cover member configured to transmit light;
a light interruption layer formed on the cover member;
an opening formed in the light interruption layer; and
at least one optical waveguide disposed within the cover member configured to correspond with the opening,
wherein the optical waveguide contains a photochromic material so that a transmittance of the optical waveguide in relation to visible light is configured to change when the optical waveguide is exposed to UV light through the opening.

18. The electronic device of claim 17, further comprising:
a light emitter configured to emit visible light to be incident on the optical waveguide; and
a light receiver configured to detect the visible light emitted from the light emitter and progressing through the optical waveguide.

19. The electronic device of claim 18, further comprising:
a substrate disposed to face the light interruption layer,
wherein the optical waveguide, the light emitter, and the light receiver are disposed on one side of the substrate.

20. The electronic device of claim 19, further comprising:
an optical waveguide recess formed on the one side of the substrate,
wherein the optical waveguide is formed in the optical waveguide recess.

21. The electronic device of claim 20, further comprising:
a light entrance surface formed on one end of the optical waveguide; and
a light emission surface formed on an other end of the optical waveguide,
wherein each of the light entrance surface and the light emission surface is formed to be inclined in relation to a longitudinal direction of the optical waveguide.

22. The electronic device of claim 21, wherein the visible light emitted from the light emitter is reflected or refracted by the light entrance surface to be incident on the optical waveguide, and the visible light progressing through the optical waveguide is reflected or refracted by the light emission surface to be incident on the light receiver.

23. An optical sensor comprising:
an optical waveguide having a transparency which changes according to a wavelength of external light;
a light emitter configured to emit visible light toward a surface of the optical waveguide; and
a light receiver configured to detect an amount of the visible light that has passed through the optical waveguide,
wherein the optical waveguide contains a photochromic material.

24. The optical sensor of claim 23, wherein the optical waveguide is disposed on a surface of a substrate.

25. The optical sensor of claim 1, wherein the visible light progresses through the optical waveguide in a longitudinal direction, with the light receiver at an end of the longitudinal direction.

* * * * *